Oct. 21, 1952        V. E. PAYNE        2,614,422
FUEL DURATION METER
Filed Jan. 6, 1949
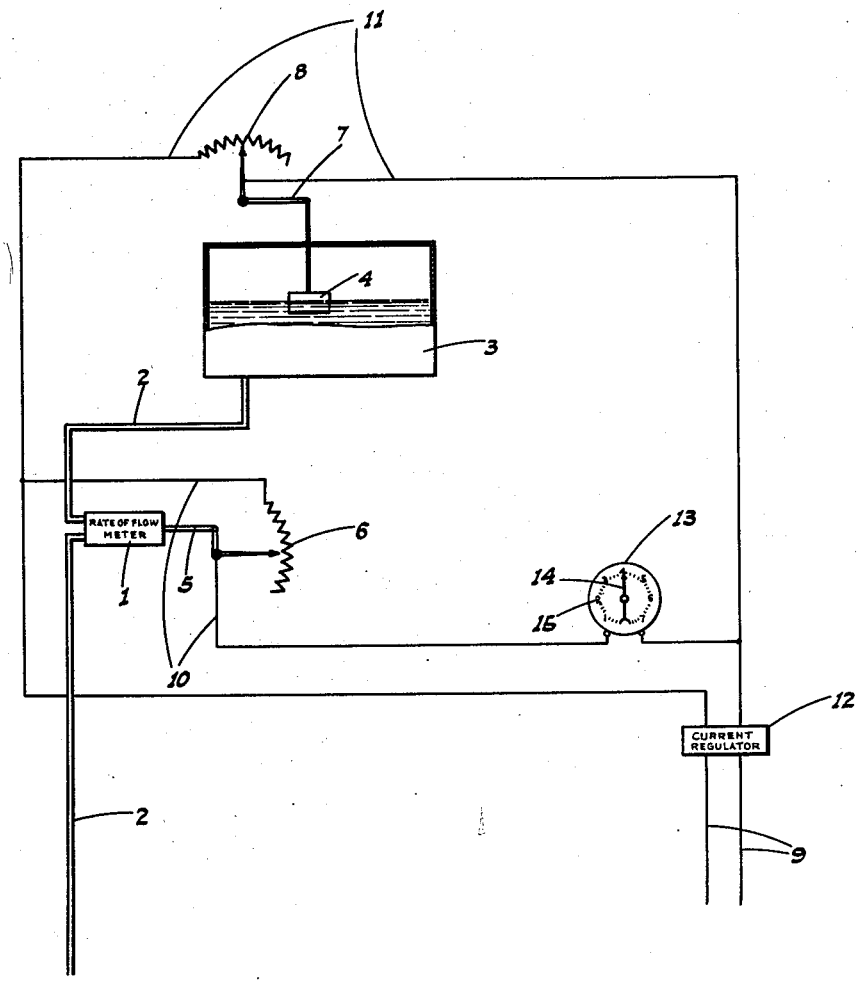
INVENTOR.
*Viron E. Payne*
BY
ATTYS Patented Oct. 21, 1952

2,614,422

UNITED STATES PATENT OFFICE 2,614,422

FUEL DURATION METER

Viron E. Payne, Sun Valley, Calif.

Application January 6, 1949, Serial No. 69,494

2 Claims. (Cl. 73—198)

This invention is directed to, and it is an object to provide, an instrument which is operative to indicate to the operator of an engine using liquid fuel, the amount of time—in terms of hours and minutes—which the engine will continue to run on the fuel remaining in the supply tank.

While the instrument is adaptable to sundry types of liquid fuel actuated engines, the invention is designed primarily for aircraft use.

Another object of the invention is to provide a fuel duration instrument which is self-compensating with respect to variations in the rate of fuel consumption; to-wit, if the engine speed or load, or both, is increased or decreased with resultant increase or decrease, respectively, in fuel consumption, the instrument will automatically reflect an adjusted proportionately lesser or greater remaining period of engine operation.

A further object of the invention is to provide a fuel duration instrument which is continuously operative to indicate, on a constantly adjusted basis as above, the remaining period of engine operation at the speed and load thereof when any reading is taken. This is a very advantageous feature, especially in connection with the operation of aircraft.

An additional object of the invention is to provide a fuel duration instrument, for the purpose described, which functions upon the principle of dividing fuel quantity by rate of consumption to determine duration of operation. This is accomplished, automatically, in the present embodiment by the division of current between parallel impedance circuits; the impedance of one circuit being variable in response to change in, and corresponding to, the rate of fuel consumption, the impedance of the other circuit being variable in response, and corresponding to, the amount of fuel in the tank, and an electric meter—scaled to read in terms of hours and minutes of fuel duration—is arranged in connection with said circuits in a manner to reflect the division of current therebetween so as to continuously give an accurate reading of the remaining period of engine operation.

A further object of the invention is to provide a practical and reliable fuel duration instrument, and one which will be exceedingly effective for the purpose for which it is designed.

These objects are accomplished by means of such structure and relative arrangement of parts as will fully appear by a perusal of the following specification and claims.

The figure of the drawing is a diagrammatic illustration of a preferred form of circuit for the instrument.

Referring now more particularly to the characters of reference on the drawings, the present embodiment of the invention as shown diagrammatically in the drawing comprises a rate of flow responsive device 1 interposed in the fuel pipe 2 which leads from the fuel tank 3 to the engine (not shown).

The fuel tank 3 is fitted with a device responsive to the amount of fuel remaining in the tank, such as a float 4.

The rate of flow responsive device 1 is mechanically linked, as at 5, to a variable impedance 6, while the float 4 is mechanically linked, as at 7, to a separate variable impedance 8.

The above arrangement is such that upon increase of the rate of flow of fuel through the pipe 2, the device 1 actuates the variable impedance 6 to a proportionate extent, and in a direction to increase the impedance. Similarly, upon reduction in the quantity of fuel in the tank 3, the device or float 4 actuates the variable impedance 8 to a proportionate extent, and in a direction to reduce the impedance.

The numeral 9 includes an input circuit which leads to connection with parallel-wired impedance circuits; one being indicated at 10 and the other at 11.

The variable impedance 6 is interposed in the circuit 10, while the variable impedance 8 is interposed in the circuit 11.

A current regulator 12 is connected in the input circuit 9 ahead of the parallel-wired impedance circuits 10 and 11, to the end that the current supplied to circuits 10 and 11 is constant at all times, and as is necessary to proper functioning of the instrument.

An electric meter 13 is interposed in either lead of the impedance circuit 11; such meter 13 including a movable hand 14 which reads on a dial 15 scaled in terms of hours and minutes.

The impedance circuit 10, including the variable impedance 6, may be termed the rate of flow or consumption sensing circuit, while the impedance circuit 11, including the variable impedance 8, may be termed the fuel quantity sensing circuit.

The instrument functions by the division of current between the circuits 10 and 11 as reflected by the meter 13 in terms of fuel duration. Such function will be clearly understood from the following formula wherein the impedance of the circuits 10 and 11 is represented by $Z_1$ and $Z_2$, the total impedance in the system by $Z$, and the current in said circuits represented by $I_1$ and $I_2$. The total current is $I_0$ and is the vector sum of the currents flowing in the two parallel circuits. The letter "V" represents the voltage drop across said two parallel circuits due to the passage of the current $I_0$. The following equations then show the relationship between the various quantities:

(1) $1/Z = 1/Z_1 + 1/Z_2$
(2) $Z = Z_1 Z_2 / (Z_1 + Z_2)$
(3) $V = I_0 Z = I_0 Z_1 Z_2 / (Z_1 + Z_2)$
(4) $I_1 = V/Z_1 = I_0 Z_1 Z_2 / (Z_1 + Z_2) Z_1 = I_0 Z_2 / (Z_1 + Z_2)$

If the rate of fuel consumption of the engine is made to equal $Z_1/K_1$ and the total fuel remaining in the tank is made equal to $Z_2/K_2$, where $K_1$ and $K_2$ are any constants, and the amount of fuel remaining at any time is represented by Q, the rate of consumption by F, and the duration by D (with Q fuel used at F rate, the following is true:

(5) $I_1 = I_0 K_2 Q / (K_1 F + K_2 Q)$
(6) $1/I_1 = (K_1 F + K_2 Q) / I_0 K_2 Q = K_1 F / I_0 K_2 Q + 1/I_0$

Now D equals Q/F, so F/Q equals 1/D. Substituting gives:

(7) $1/I_1 = K_1 / I_0 K_2 D + 1/I_0 = (K_1 + K_2 D) / I_0 K_2 D$
(8) $I_1 = I_0 K_2 D / (K_1 + K_2 D)$
(9) $D = (I_1 K_1 + I_1 K_2 D) / I_0 K_2$
(10) $1 = I_1 K_1 / I_0 K_2 D + I_1 K_2 / I_0 K_2$
(11) $I_1 K_1 / I_0 K_2 D = 1 - I_1 K_2 / I_0 K_2 = 1 - I_1/I_0$
(12) $I_1 K_1 / I_0 K_2 = D(I_0 - I_1)/I_0$
(13) $D = (I_1 K_1 / I_0 K_2) I_0 / (I_0 - I_1) = (K_1/K_2) \cdot I_1/(I_0 - I_1)$ In the final equation shown above, the duration is shown to be given by the relation between two variables multiplied by the ratio of the two constants.

It will be seen that there is no theoretical restriction placed on the type of impedances used, as long as the values of the impedances are varied in accordance with the rule given.

It is thus evident that the instrument described herein will indicate, within relatively accurate limits, the remaining duration of engine operation, at the existing rate of fuel consumption and with the amount of fuel remaining, at the time of check.

It is to be understood that for any particular adaptation of the instrument, and its circuit as in the figure of the drawing, the variable impedances 6 and 8, the rate of flow device 1, the meter 13, and the current regulator 12 will be of predetermined capacity and suitably normally balanced relative to each other.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An instrument for indicating fuel duration for an engine fed from a tank having a quantity of fuel therein, comprising means responsive to the rate of flow of fuel feeding between the engine and tank, means responsive to the amount of fuel remaining in the tank, separate variable impedances mechanically linked to the means responsive to the rate of fuel flow and to the means responsive to the amount of fuel remaining in the tank for actuation thereby, a separate circuit in which each impedance is interposed, said circuits being connected in parallel, means to supply a constant current to said parallel circuits, and a current meter interposed in one of said circuits operative to reflect the division of current therebetween, said current meter being calibrated in terms of fuel duration; there being an input circuit connected to said parallel circuits, and said constant circuit supply means including a current regulator in the input circuit.

2. An instrument for indicating fuel duration for an engine fed from a tank having a quantity of fuel therein, comprising a pair of separate impedance circuits each including a variable impedance, said circuits being connected in parallel, means to feed a constant current to said parallel circuits, a current meter in one of said circuits, said meter being calibrated in terms of fuel duration, means operative to vary one impedance in response to the rate of fuel consumption by the engine, and means including a fuel level float to vary the other impedance in response to the amount of fuel remaining in the tank.

VIRON E. PAYNE.

REFERENCES CITED

The following references are of record in the file of this patent:

UNITED STATES PATENTS

| Number | Name | Date |
|---|---|---|
| 1,533,530 | Wheatley et al. | Apr. 14, 1925 |
| 1,655,276 | Lichtscheindl | Jan. 3, 1928 |
| 2,169,048 | Howe et al. | Aug. 8, 1939 |
| 2,500,585 | Sylvander | Mar. 4, 1950 |

FOREIGN PATENTS

| Number | Country | Date |
|---|---|---|
| 819,460 | France | July 12, 1937 |